(12) United States Patent
Hariharan et al.

(10) Patent No.: US 12,409,757 B2
(45) Date of Patent: Sep. 9, 2025

(54) COOLING METHOD AND SYSTEM

(71) Applicant: Ford Global Technologies, LLC, Dearborn, MI (US)

(72) Inventors: Ashwin Hariharan, Ann Arbor, MI (US); Hamish Lewis, Troy, MI (US); Ron Razzano, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 18/475,102

(22) Filed: Sep. 26, 2023

(65) Prior Publication Data

US 2024/0010102 A1 Jan. 11, 2024

Related U.S. Application Data

(62) Division of application No. 17/185,296, filed on Feb. 25, 2021, now Pat. No. 11,813,963.

(51) Int. Cl.
| | |
|---|---|
| *B60L 58/26* | (2019.01) |
| *H01M 10/613* | (2014.01) |
| *H01M 10/625* | (2014.01) |
| *H01M 10/63* | (2014.01) |
| *H01M 10/65* | (2014.01) |
| *H01M 10/6556* | (2014.01) |
| *H01M 10/6569* | (2014.01) |

(52) U.S. Cl.
CPC ........... *B60L 58/26* (2019.02); *H01M 10/613* (2015.04); *H01M 10/625* (2015.04); *H01M 10/63* (2015.04); *H01M 10/65* (2015.04); *H01M 10/6556* (2015.04); *H01M 10/6569* (2015.04); *B60L 2240/54* (2013.01); *B60L 2240/62* (2013.01); *H01M 2220/20* (2013.01)

(58) Field of Classification Search
CPC .. H01M 10/613; H01M 10/625; H01M 10/63; H01M 10/65; H01M 10/6556; H01M 10/6569; B60L 58/26; B60L 2240/54; B60L 2240/62
USPC ......................................................... 429/62
See application file for complete search history.

(56) References Cited

U.S. PATENT DOCUMENTS

| | | | |
|---|---|---|---|
| 6,425,353 B1 | 7/2002 | Davies | |
| 9,707,822 B2 | 7/2017 | Cheng | |
| 9,914,462 B2* | 3/2018 | Porras | ............ B60W 30/18054 |
| 10,336,180 B2 | 7/2019 | Hussain | |
| 10,414,240 B2 | 9/2019 | Eisele et al. | |
| 11,757,145 B2* | 9/2023 | Wiese | ................. H01M 10/486 |
| | | | 429/62 |
| 11,813,963 B2* | 11/2023 | Hariharan | ........... H01M 10/625 |
| 2005/0028542 A1* | 2/2005 | Yoshida | .............. H01M 10/625 |
| | | | 62/186 |

(Continued)

*Primary Examiner* — Hau V Phan
(74) *Attorney, Agent, or Firm* — David Kelley; McCoy Russell LLP

(57) ABSTRACT

Methods and systems for cooling an electric energy storage device are described. In one example, a temperature set point of a cooling system is reduced before a vehicle reaches a location along a travel route where load on the electric energy storage device is expected to be greater than a threshold load. By lowering the temperature set point, it may be possible to maintain a temperature of the electric energy storage device below a threshold temperature.

11 Claims, 5 Drawing Sheets

(56) References Cited

U.S. PATENT DOCUMENTS

| | | | |
|---|---|---|---|
| 2005/0285445 A1* | 12/2005 | Wruck | H02J 9/002 |
| | | | 307/10.1 |
| 2007/0006824 A1 | 1/2007 | Saotome | |
| 2013/0175022 A1* | 7/2013 | King | B60L 50/62 |
| | | | 237/12.3 B |
| 2013/0333871 A1 | 12/2013 | Pimlott | |
| 2015/0140366 A1* | 5/2015 | Nicholls | H01M 10/633 |
| | | | 429/50 |
| 2017/0282677 A1 | 10/2017 | Eisele et al. | |
| 2018/0244130 A1 | 8/2018 | Lee | |
| 2019/0070924 A1 | 3/2019 | Mancini et al. | |
| 2019/0271258 A1 | 9/2019 | Mendez Abrego et al. | |
| 2019/0316849 A1 | 10/2019 | Mendez Abrego et al. | |
| 2020/0171916 A1 | 6/2020 | Shrivastava et al. | |
| 2020/0339010 A1* | 10/2020 | Villanueva | H01M 10/625 |
| 2020/0369108 A1 | 11/2020 | Kim et al. | |
| 2021/0053689 A1* | 2/2021 | Lynn | B60L 3/0092 |

* cited by examiner

COOLING METHOD AND SYSTEM

CROSS REFERENCE TO RELATED APPLICATION

The present application is a divisional of U.S. Non-Provisional patent application Ser. No. 17/185,296, entitled "COOLING METHOD AND SYSTEM", and filed on Feb. 25, 2021. The entire contents of the above-listed application are hereby incorporated by reference for all purposes.

FIELD

The present description relates to methods and a system for cooling a traction battery and a passenger compartment of a vehicle. The methods and system may be particularly useful for vehicles that include refrigerant based cooling.

BACKGROUND AND SUMMARY

A vehicle may include a battery that provides power to propel a vehicle. The battery may generate waste heat when power is added to or removed from the battery. It may be desirable to maintain battery temperature within a particular temperature range so that the battery may perform as expected and without rapidly degrading. The battery temperature may be maintained within the particular temperature range by removing waste heat from the battery via a cooling system. However, the cooling system may lack capacity to maintain the battery within a desired temperature range when load on the battery is high. Therefore, it may be desirable to provide a way of maintaining battery temperature during high battery load conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1:
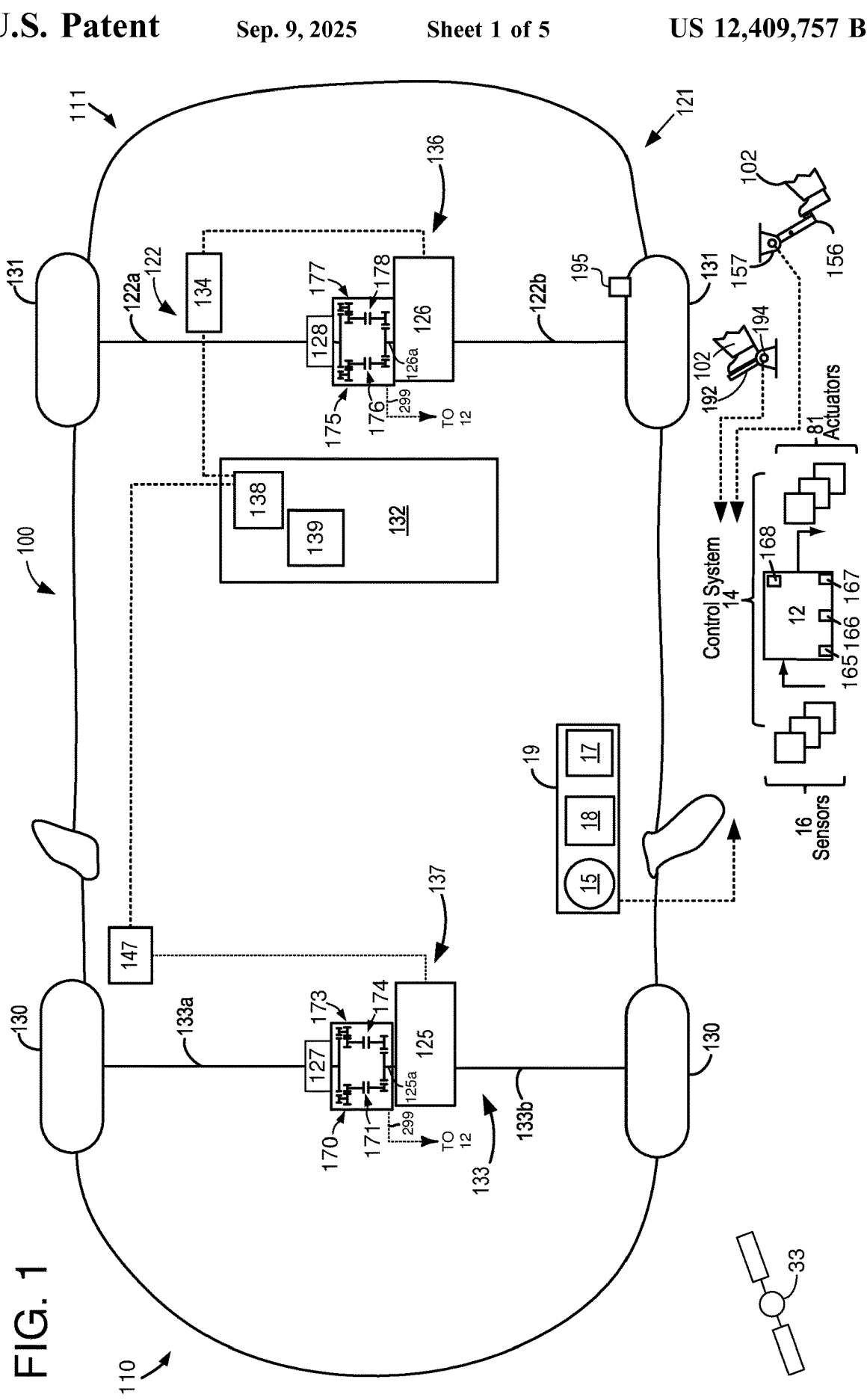
FIG. 1 is a schematic diagram of a non-limiting vehicle.
Figure 2:
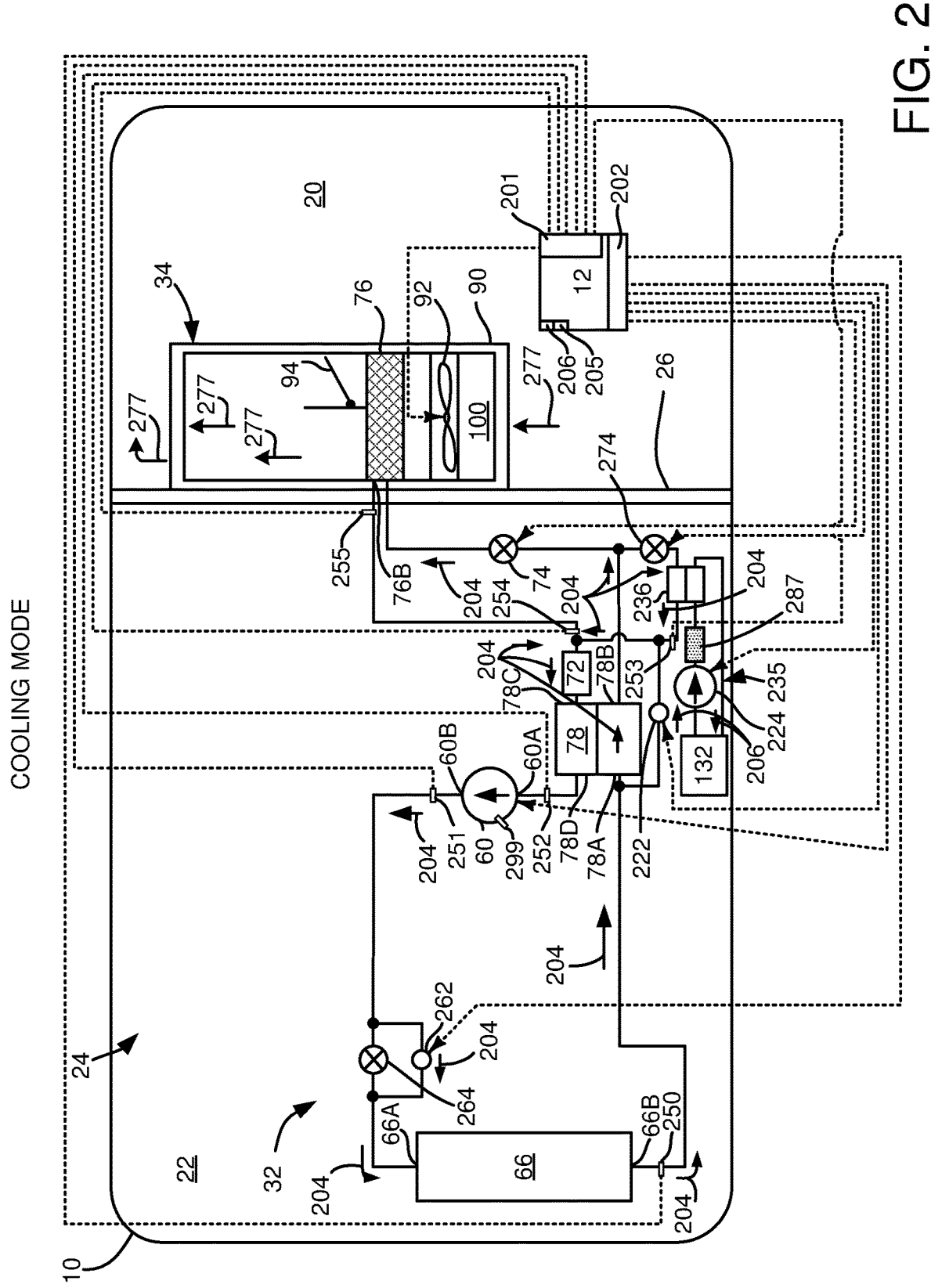
FIG. 2 shows a vehicle cooling system that may cool a battery and a passenger compartment of a vehicle.
Figure 3:
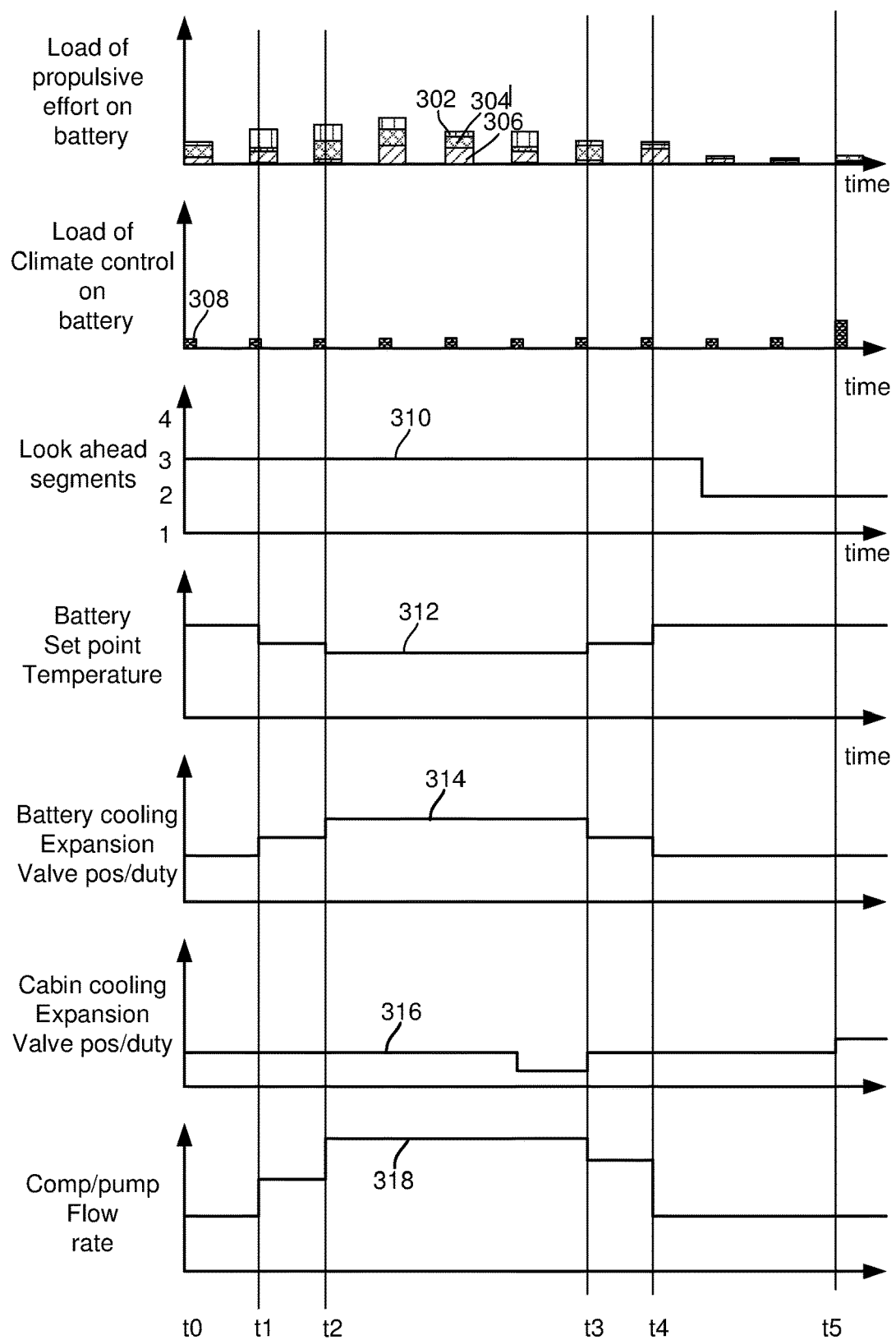
FIG. 3 shows an example operating sequence according to the method of FIG. 4 and the system of FIGS. 1 and 2.
Figure 4:
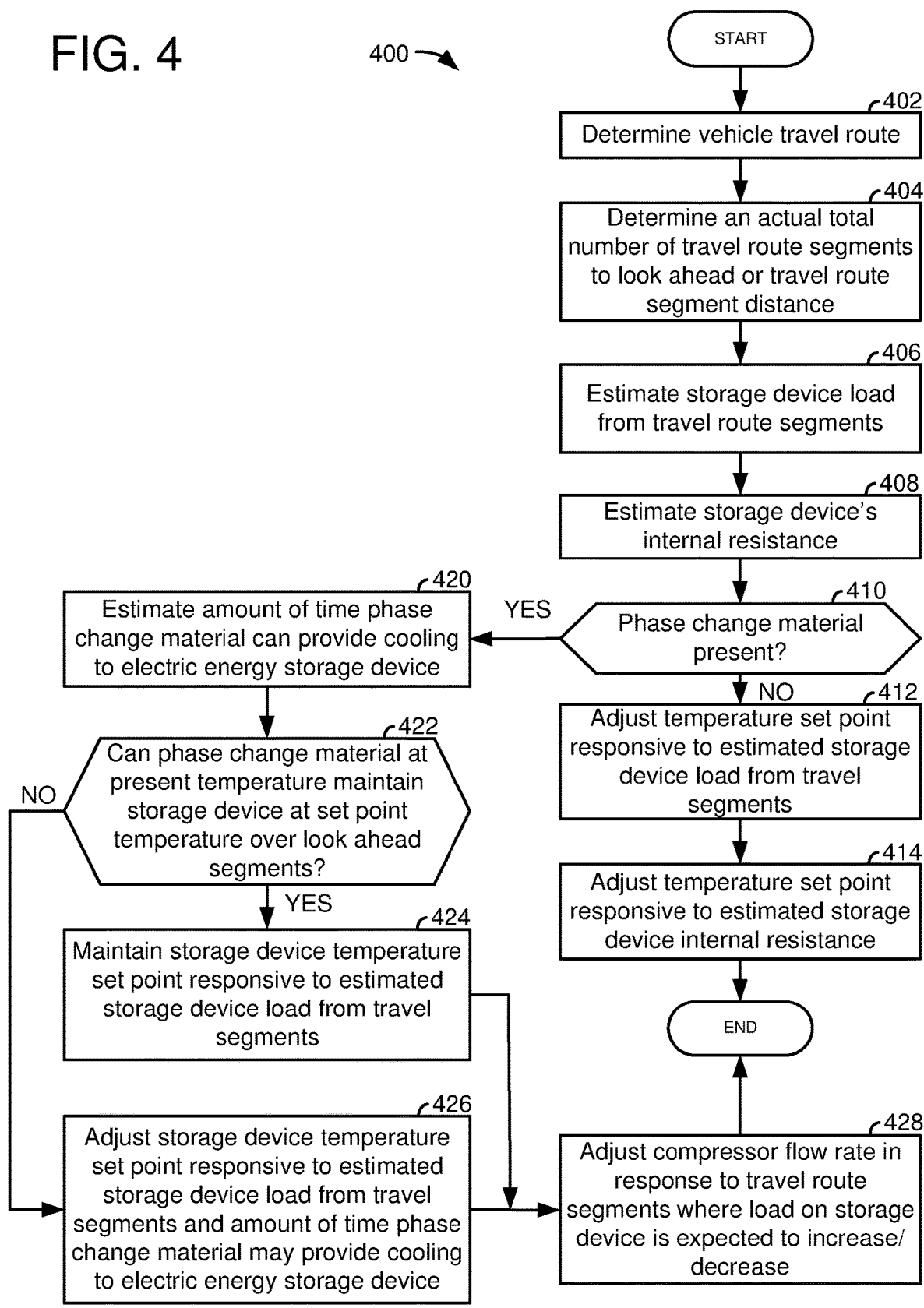
FIG. 4 shows a flowchart of an example method for cooling a traction battery and a vehicle passenger compartment.
Figure 5:
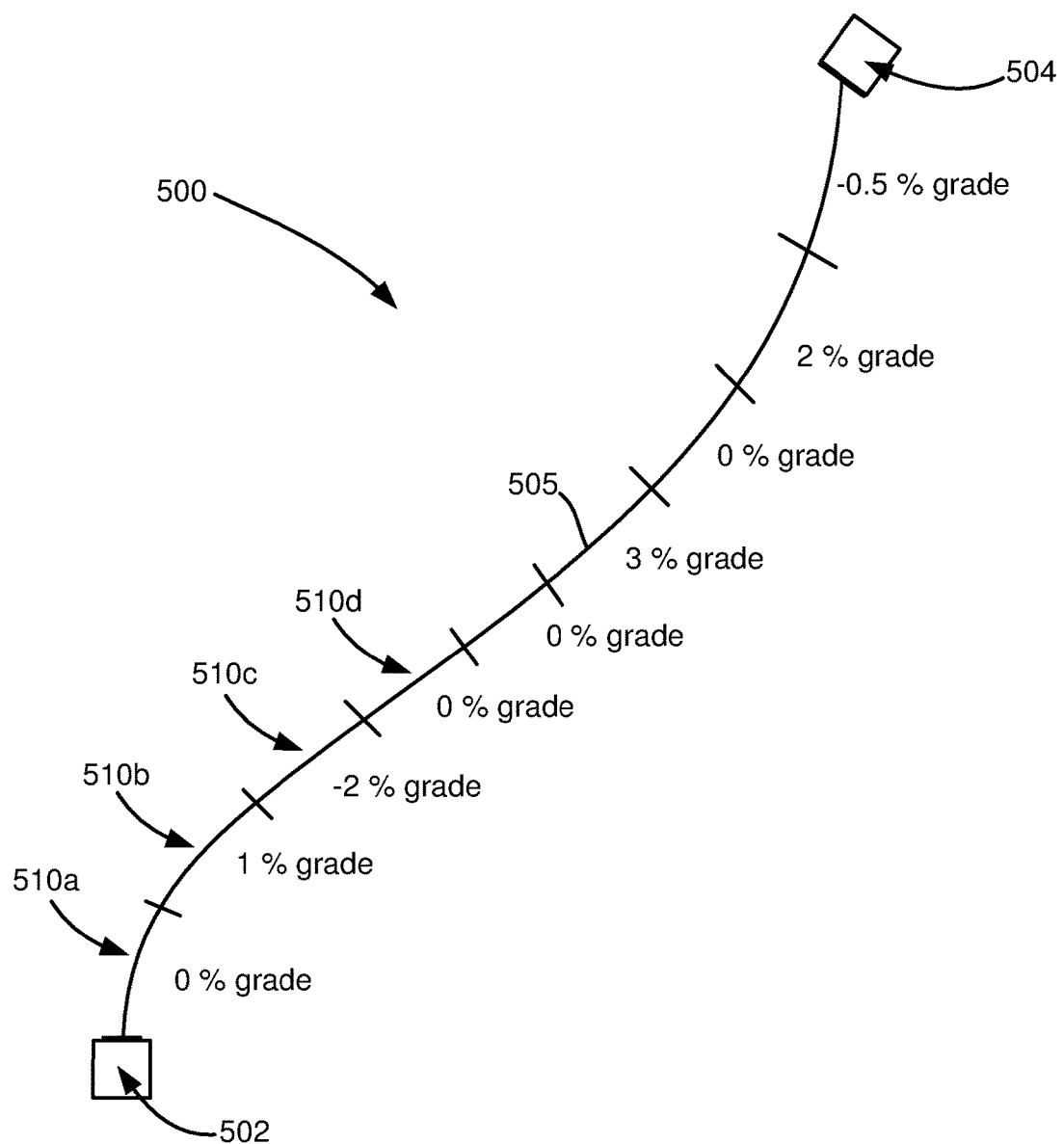
FIG. 5 shows example road segments for a travel route.

The present description is related to operating a cooling system that provides cooling to a traction battery. The cooling system may also provide cooling to a passenger compartment of a vehicle. In one example, the cooling system may include a refrigerant to move heat from a first location to a second location. The cooling system may be part of an electric vehicle as shown in FIG. 1. Alternatively, the cooling system may be part of a hybrid vehicle or of a fuel cell vehicle. The cooling system may be configured as shown in FIG. 2 or in another arrangement. The cooling system may apply refrigerant as a cooling medium. The cooling system may be operated as shown in FIG. 3 to improve vehicle operation. A method for operating the cooling system is shown in FIG. 4. An example travel route that is broken into segments is shown in FIG. 5.

A vehicle may include a refrigerant (e.g., R410A) based cooling system to cool areas and components of a vehicle. The cooling system may be configured as a heat pump, which may swap functionality of heat exchangers in the heat pump during varying operating conditions. The vehicle's cooling system may provide cooling to different areas of a vehicle and devices within the vehicle at a same time. For example, the cooling system may cool a traction battery and a passenger compartment of a vehicle at a same time. The cooling system may adjust a speed of a refrigerant pump and positions of one or more valves (e.g., expansion valves) to provide different levels of cooling capacity to the devices and areas of the vehicle. However, the cooling system may lack capacity to cool the vehicle devices (e.g., a battery) during conditions when the vehicle device is under high load. Further, a comfort level of vehicle passengers may degrade if cooling priority is given to a vehicle device rather than cooling of a vehicle compartment. Therefore, it may be desirable to provide a way of operating a vehicle cooling system that may maintain cooling of vehicle devices when the vehicle devices are operating under high loads.

The inventors herein have recognized the above-mentioned disadvantage and have developed a method for operating a cooling system of a vehicle, comprising: adjusting a temperature set point of a cooling system in response to an expected load on a device that is based on navigational data; and adjusting a flow rate of a cooling medium in response to a load on the device increasing when a vehicle is at a location where the expected load increases.

By adjusting a temperature set point of a cooling system in response to an expected load on a device that is based on navigational data, it may be possible to maintain a temperature of the device below a threshold temperature so that performance of the device may be maintained. In addition, by pre-cooling the device via lowering the temperature set point, it may be possible to maintain cooling of a passenger compartment of a vehicle so that comfort of vehicle occupants may be maintained.

The present description may provide several advantages. Specifically, the approach may improve vehicle performance during high load conditions. Further, the approach may permit a cooling system to maintain desired temperatures for two cooling circuits. In addition, the approach may dynamically change a look ahead distance so that an amount of cooling system lead may match an amount of time needed for the cooling system to meet a new set point temperature, which may allow the set point to be achieved while limiting energy consumption.

The above advantages and other advantages, and features of the present description will be readily apparent from the following Detailed Description when taken alone or in connection with the accompanying drawings.

Referring to FIG. 1, a non-limiting example vehicle propulsion system 100 for vehicle 121 is shown. A front portion of vehicle 121 is indicated at 110 and a rear portion of vehicle 121 is indicated at 111. Vehicle propulsion system 100 includes at two propulsion sources including front electric machine 125 and rear electric machine 126. However, in other examples, vehicle 121 may include only one electric machine. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 includes a front axle 133 and a rear axle 122. In some examples, rear axle may comprise two half shafts, for example first half shaft 122a, and second half shaft 122b. Likewise, front axle 133 may comprise a first half shaft 133a and a second half shaft 133b. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126a of rear electric machine 126. Low gear 175 may be engaged via fully closing low gear clutch 176. High gear 177 may be engaged via fully closing high gear clutch 178. High gear clutch 178 and low gear clutch 177 may be opened and closed via commands received by rear drive unit 136 over CAN 299. Alternatively, high gear clutch 178 and low gear clutch 177 may be opened and closed via digital outputs or pulse widths provided via control system 14. Rear drive unit 136 may include differential 128 so that torque may be provided to axle 122a and to axle 122b. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125a of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential 127 so that torque may be provided to axle 133a and to axle 133b. In some examples, an electrically controlled differential clutch (not shown) may be included in rear drive unit 137.

Electric machines 125 and 126 may receive electrical power from onboard electrical energy storage device 132 (e.g., a traction battery or a battery that provides power for propulsive effort of a vehicle). Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current (AC) generated by rear electric machine 126 to direct current (DC) for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including compartment heating and air conditioning, engine starting, headlights, compartment audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a propulsive effort pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory memory (e.g., read only memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites 33, and from the signal identify the geographical location of the vehicle. In some examples, the geographical location coordinates may be communicated to controller 12. The navigation system may also break a travel route into an actual total number of segments so that vehicle operation in the segments may be predicted. Navigation system 17 may communicate data from the travel route to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that require a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the engine.

Referring to FIG. 2, a schematic representation of a vehicle 10 with a non-limiting cooling system 24 is shown. Flow direction arrows (e.g., 204) describe refrigerant flow in cooling system 24 when cooling system 24 is operated in a cooling mode. The vehicle 10 may have any suitable drivetrain and may include an engine 12 that may be used to propel the vehicle and/or power vehicle components. The vehicle 10 may include a single engine 12 as shown in FIG. 1 and it may be configured as an internal combustion engine adapted to combust any suitable type of fuel, such as gasoline, diesel fuel, or hydrogen. As another option, vehicle 10 may be configured as a hybrid vehicle that may have a plurality of power sources, such as a non-electrical power source like an engine and an electrical power source as is shown in FIG. 1. In still other examples, the vehicle may be an electric vehicle that is propelled solely via an electric machine. The vehicle 10 may include a passenger compartment 20, an engine compartment 22, and a cooling system 24. Devices and fluidic passages or conduits are shown as solid lines in FIG. 2. Electrical connections are shown as dashed lines in FIG. 2.

The passenger compartment 20 may be disposed inside the vehicle 10 and may receive one or more occupants. A portion of the climate control system 24 may be disposed in the passenger compartment 20.

The engine compartment 22 may be disposed proximate the passenger compartment 20. An engine 12 and/or an electric machine 14 as well as a portion of the cooling system 24 may be disposed in the engine compartment 22. The engine compartment 22 may be separated from the passenger compartment 20 by a bulkhead 26.

Controller 12 may supply current and voltage to adjust a speed of compressor 60. Compressor 60 may pressurize and circulate the refrigerant through the heat pump subsystem 32. The compressor 60 may be powered by an electrical power source. Speed of compressor 60 may be determined via sensor 299 which may be electrically coupled to controller 12. Compressor 60 is shown directly coupled to an inlet side of first control valve 262 and an inlet side of first expansion device 264, which may be a fixed area expansion device. The first expansion device 264 may be provided to change the pressure of the refrigerant. For instance, the first expansion device 264 may be a fixed area expansion device or variable position valve that may or may not be externally controlled via controller 12. The first expansion device 264 may reduce the pressure of the refrigerant that passes through the first expansion device 264 from the intermediate heat exchanger 42 to the exterior heat exchanger 66. As such, high pressure refrigerant received from the intermediate heat exchanger 42 may exit the first expansion device 64 at a lower pressure and as a liquid and vapor mixture.

First control valve 262 may be selectively opened and closed via controller 12. When first control valve 262 is in an open position, it provides a path of least fluidic resistance to exterior heat exchanger 66 such that there is little pressure drop across fixed area expansion device 264. Outlet sides of fixed area expansion device 264 and first control valve 262 are shown directly coupled to an inlet side 66A of exterior heat exchanger 66. An outlet side 66B of exterior heat exchanger 66 is shown directly coupled to a first inlet side 78A of internal heat exchanger 78 and coupled to an inlet side of accumulator 72 via second control valve 222. The exterior heat exchanger 66 may be disposed outside the passenger compartment 20. In a cooling mode or air conditioning context, the exterior heat exchanger 66 may function as a condenser and may transfer heat to the surrounding environment to condense the refrigerant from a vapor to liquid. In a heating mode, the exterior heat exchanger 66 may function as an evaporator and may transfer heat from the surrounding environment to the refrigerant, thereby causing the refrigerant to vaporize. A first outlet side 78B of internal heat exchanger 78 is directly coupled to inlets of second expansion device 74 and third expansion valve 274.

Internal heat exchanger 78, may transfer thermal energy between refrigerant flowing through different regions of the heat pump subsystem 32. Internal heat exchanger 78 may be disposed outside the passenger compartment 20. In a cooling mode or air conditioning context, heat may be transferred from refrigerant that is routed from the exterior heat exchanger 66 to the interior heat exchanger 76 to refrigerant that is routed from the accumulator 72 to the compressor In the heating mode, the internal heat exchanger 78 does not transfer thermal energy between such refrigerant flow paths since the second expansion device 74 is closed, thereby inhibiting the flow of refrigerant through a portion of the internal heat exchanger 78.

The second expansion device 74 may be disposed between and may be in fluid communication with the exterior heat exchanger 66 and the interior heat exchanger 76. The second expansion device 74 may have a similar configuration as the first expansion device 264 and may be provided to change the pressure of the refrigerant similar to the first expansion device 264. In addition, the second expansion device 74 may be closed to inhibit the flow of refrigerant. More specifically, the second expansion device 74 may be closed to inhibit the flow of refrigerant from the exterior heat exchanger 66 to the interior heat exchanger 76 in a heating mode.

An outlet side of second expansion device 74 is directly coupled to an inlet side of interior heat exchanger 76. And outlet side 76B of interior heat exchanger 76 is directly coupled to an inlet of accumulator 72. The interior heat exchanger 76 may be in fluid communication with the second expansion device 74. The interior heat exchanger 76 may be disposed inside the passenger compartment 20. In a cooling mode or air conditioning context, the interior heat exchanger 76 may function as an evaporator and may receive heat from air in the passenger compartment 20 to vaporize the refrigerant. Refrigerant exiting the interior heat exchanger 76 is directly routed to the accumulator 72. In the heating mode, refrigerant may not be routed to the interior heat exchanger 76 due to the closure of the second expansion device 74.

An outlet of accumulator 72 is directly coupled to second inlet 78C of internal heat exchanger 78. The accumulator 72 may act as a reservoir for storing any residual liquid refrigerant so that vapor refrigerant rather than liquid refrigerant may be provided to the compressor 60. The accumulator 72 may include a desiccant that absorbs small amounts of water moisture from the refrigerant. A second outlet 78D of internal heat exchanger 78 is directly coupled to inlet or suction side 60A of compressor 60.

An outlet side of second control valve 222 is directly coupled to an inlet of accumulator 72 and an outlet of battery chiller heat exchanger 236. An outlet side of third expansion valve 274 is directly coupled to an inlet side of battery chiller heat exchanger 236. An outlet side of battery chiller heat exchanger 236 is directly coupled to an inlet side of accumulator 72. Third expansion valve 274 may be a thermostatic expansion valve (TXV) with shutoff, a fixed area expansion device, or an electronic expansion valve (EXV). In this example, battery chiller expansion device 274 and expansion device 74 include shut-off valves for preventing flow through the respective valves.

Battery coolant loop 235 includes coolant, electrical energy storage device 132 (as shown in FIG. 1), battery coolant pump 224, and battery coolant heat exchanger 236. Heat from second electrical energy storage device 220 may be rejected to refrigerant flowing through battery coolant heat exchanger 236. Thus, coolant in battery coolant loop 235 is fluidically isolated from refrigerant in heat pump subsystem 32. In some examples, battery coolant loop 235 may include a phase change material (PCM) (e.g., paraffins, salt hydrates, etc.) 287. The phase change material may operate to maintain a temperature of coolant in the coolant loop during conditions when load on the electric energy storage device or battery are high.

The cooling system 24 may circulate air and/or control or modify the temperature of air that is circulated in the passenger compartment 20. The cooling system 24 may include a heat pump subsystem 32 and a ventilation subsystem 34.

The heat pump subsystem 32 may transfer thermal energy to or from the passenger compartment 20. In at least one example, the heat pump subsystem 32 may be configured as a vapor compression heat pump subsystem in which a fluid is circulated through the heat pump subsystem 32 to transfer thermal energy to or from the passenger compartment 20. The heat pump subsystem 32 may operate in various modes, including, but not limited to a cooling mode and a heating mode. In the cooling mode, the heat pump subsystem 32 may circulate a heat transfer fluid, which may be called a refrigerant, to transfer thermal energy from inside the passenger compartment 20 to outside the passenger compartment 20.

The ventilation subsystem 34 may circulate air in the passenger compartment 20 of the vehicle 10. In addition, airflow through the housing 90 and internal components is represented by the arrowed lines 277.

Controller 12 includes executable instructions of the methods in FIG. 4 to operate the valves, fans, and pumps or compressors of the system shown in FIG. 2. Controller 12 includes inputs 201 and outputs 202 to interface with devices in the system of FIG. 2. Controller 12 also includes a central processing unit 205 and non-transitory memory 206 for executing the method of FIG. 4.

Each of the devices shown in FIG. 2 that are fluidically coupled via conduits (e.g., solid lines) have an inlet and an outlet based on the direction of flow direction arrows 204 and 206. Inlets of the devices are locations where the conduit enters the device in the direction of flow according to the flow direction arrows. Outlets of the devices are locations where the conduit exits the device in the direction of flow according to the flow direction arrows.

The system of FIG. 2 may be operated in a cooling mode. In cooling mode, passenger compartment 20 may be cooled. The cooling mode is activated by opening fixed first control valve 262, opening the shut-off valve of battery chiller TXV 274 if battery chilling is desired, opening the shut-off valve of expansion device 74, closing second control valve 222, activating compressor 60, activating fan 92, and activating battery chiller pump 224 if desired.

During cooling mode, refrigerant flows through heat pump subsystem 32 in the direction of arrows 204. Coolant flows in battery chiller loop 236 in the direction indicated by arrows 206. Thus, in cooling mode, refrigerant exits compressor 60 and enters the first control valve 262, thereby reducing flow through expansion device 264, so that the pressure loss across expansion device 264 is small. Refrigerant travels from the first control valve 262 to the exterior heat exchanger 66 which operates as a condenser. Condensed refrigerant then enters internal heat exchanger 78 where heat may be transferred from condensed refrigerant entering internal heat exchanger 78 from exterior heat exchanger 66 to vapor refrigerant entering internal heat exchanger from interior heat exchanger 76. The liquid refrigerant then enters expansion device 74 and battery chiller TXV 274 where it expands to provide cooling to passenger compartment and battery chiller loop 235. Heat is transferred from coolant circulating in battery chiller loop 235 to refrigerant in heat pump subsystem 32 via battery chiller heat exchanger 236. Likewise, heat is transferred from passenger compartment 20 to refrigerant in heat pump subsystem 32 via interior heat exchanger 76. The heated refrigerant is directed to internal heat exchanger 78 before it is returned to compressor 60 to be recirculated.

The ventilation subsystem 34 may circulate air in the passenger compartment 20 of the vehicle 10. The ventilation subsystem 34 may have a housing 90, a blower 92, and a temperature door 94. The housing 90 may receive components of the ventilation subsystem 34. In FIG. 2, the housing 90 is illustrated such that internal components are visible rather than hidden for clarity. In addition, airflow through the housing 90 and internal components is represented by the arrowed lines 277. The housing 90 may be at least partially disposed in the passenger compartment 20. For example, the housing 90 or a portion thereof may be disposed under an instrument panel of the vehicle 10. The housing 90 may have an air intake portion 100 that may receive air from outside the vehicle 10 and/or air from inside the passenger compartment 20. For example, the air intake portion 100 may receive ambient air from outside the vehicle 10 via an intake passage, duct, or opening that may be located in any suitable location, such as proximate a cowl, wheel well, or other vehicle body panel. The air intake portion 100 may also receive air from inside the passenger compartment 20 and recirculate such air through the ventilation subsystem 34. One or more doors or louvers may be provided to permit or inhibit air recirculation.

The blower 92 may be disposed in the housing 90. The blower 92, which may also be called a blower fan, may be disposed near the air intake portion 100 and may be configured as a centrifugal fan that may circulate air through the ventilation subsystem 34.

The temperature door 94 is disposed downstream of the interior heat exchanger 76. The temperature door 94 may move between a plurality of positions to provide air having a desired temperature.

Temperature sensor 250 senses refrigerant temperature at outlet side 66B of exterior heat exchanger 66. Temperature sensor 250 may be located on a fin or tube of exterior heat exchanger 66. Alternatively, temperature sensor 250 may be located in a flow path of refrigerant in exterior heat exchanger 66. Pressure sensor 251 senses refrigerant pressure at outlet side 60B of compressor 60. Optional pressure sensor 252 senses refrigerant pressure at inlet side or suction side 60A of compressor 60. Pressure sensor 253 senses refrigerant pressure at an outlet side of battery chiller heat exchanger 236. Optional pressure sensor 254 senses refrigerant pressure at an inlet side of accumulator 72. Temperature sensor 255 senses refrigerant temperature an outlet side of interior heat exchanger 76. Temperature sensor 255 may be located on a fin or tube of interior heat exchanger 76. Alternatively, temperature sensor 255 may be located in a flow path of refrigerant in interior heat exchanger 76. Signals from temperature and pressure sensors 250-255 are input to controller 12.

A first temperature set point for cooling system 24 may be a temperature at the outlet of interior heat exchanger 76. The first temperature set point may be achieved via adjusting a speed of compressor 60 and a position of expansion valve 74. If expansion valve 74 is a two state device, a duty cycle that expansion valve 74 is commanded open and closed may adjust a temperature at the outlet side of interior heat exchanger 76 to achieve the first temperature set point. For example, if first temperature set point is a lower temperature, expansion valve 74 may be commanded to a higher duty cycle, greater than 75% for example. If the first temperature set point is a higher temperature, expansion valve 74 may be commanded to a lower duty cycle, less than 40% for example. If a position of expansion valve 74 may be adjusted to a plurality of positions, the position of expansion valve 74 may be adjusted to provide the first temperature set point.

A second temperature set point for cooling system 24 may be a temperature at the outlet of battery chiller heat exchanger 236. The second temperature set point may be achieved via adjusting a speed of compressor 60 and a position of expansion valve 274. If expansion valve 274 is a two state device, a duty cycle that expansion valve 274 is commanded open and closed may adjust a temperature at the outlet side of battery chiller heat exchanger 236 to achieve the second temperature set point. For example, if second temperature set point is a lower temperature, expansion valve 274 may be commanded to a higher duty cycle, greater than 65% for example. If the second temperature set point is a higher temperature, expansion valve 274 may be commanded to a lower duty cycle, less than 40% for example. If a position of expansion valve 274 may be adjusted to a plurality of positions, the position of expansion valve 274 may be adjusted to provide the second temperature set point. Expansion valve 274 is arranged in parallel with expansion valve 74 so that temperatures of the passenger compartment 20 and of battery 132 may be controlled simultaneously.

The system of FIGS. 1 and 2 provides for a vehicle system, comprising: a cooling system including a device that is cooled via the cooling system; and a controller including executable instructions stored in non-transitory memory that cause the controller to adjust a speed of a pump to decrease a temperature for the device in response to an expected load on the device at a location of a travel route, the location an actual total number of travel route segments ahead of a vehicle's present location. The vehicle system includes where the actual total number of travel route segments varies with vehicle operating conditions. The vehicle system includes where a length of the travel route segments varies with vehicle operating conditions. The vehicle system further comprises additional executable instructions that cause the controller to adjust a position of a valve in response to the expected load on the device, and where the device is a traction battery. The vehicle system further comprises a phase changing material included in the cooling system. The vehicle system further comprises additional executable instructions that cause the controller to reduce a temperature of the phase changing material in response to the expected load. The vehicle system includes where the phase change material is included in a traction battery coolant loop.

Referring now to FIG. 3, an example prophetic cooling system operating sequence according to the method of FIG. 4 is shown. The plots of FIG. 3 are time aligned. The sequence of FIG. 3 may be generated via the system of FIGS. 1 and 2 in cooperation with the method of FIG. 4. The vertical lines at times t0-t5 represent times of interest in the plots.

The first plot from the top of FIG. 3 is a plot of estimated load that a propulsive effort device (e.g., an electric machine) will, or is expected to, put on a battery versus time. The estimated load that the propulsive effort device, will or is expected to, put on the battery increases in the direction of the vertical axis arrow. The horizontal axis represents time and time increases from the left side of the figure to the right side of the figure. Heights of vertical bars 302-306 represent estimated load values that propulsive effort will put on a battery for individual travel route segments. Vertical bars filled with vertical lines as shown at 302 represent an estimated load value that propulsive effort will put on a battery three travel segments in front of the present travel route segment that the vehicle is traveling on. Vertical bars filled with cross hatched lines as shown at 304 represent an estimated load value that propulsive effort will put on a battery two travel segments in front of the present travel route segment that the vehicle is traveling on. Vertical bars filled with hatched lines as shown at 306 represent an estimated load value that propulsive effort will put on a battery one travel segment in front of the present travel route segment that the vehicle is traveling on. New vertical bars (e.g., 302, 304, and 306) are shown each time the vehicle enters into a new travel route segment. The new vertical bars forecast the estimated load that the propulsive effort device will, or is expected to, put on the battery.

The second plot from the top of FIG. 3 is a plot of load that a climate control system applies to a battery versus time. The load on the battery increases in the direction of the vertical axis arrow. The horizontal axis represents time and time increases from the left side of the figure to the right side of the figure. Vertical bars 308 represent the amount of load that the climate control system applies to a battery versus time.

The third plot from the top of FIG. 3 is an actual total number of travel route segments that the system uses to look ahead in time. The actual total number of travel route segments that the system uses to look ahead in time increases in the direction of the vertical axis arrow. The horizontal axis represents time and time increases from the left side of the figure to the right side of the figure. Line 310 represent the actual total number of look ahead segments that are being used in the estimation of load that propulsive effort will put on a battery versus time The fourth plot from the top of FIG. 3 is a plot of a battery set point temperature (e.g., a temperature that the battery is regulated to) versus time. The battery set point temperature value increases in the direction of the vertical axis arrow. Increasing the battery set point temperature may increase battery temperature. The horizontal axis represents time and time increases from the left side of the figure to the right side of the figure. Line 312 represents the battery temperature set point versus time The fifth plot from the top of FIG. 3 is a plot of a position of a battery cooling expansion valve (e.g., 274 of FIG. 2) versus time. The vertical axis represents battery cooling expansion valve position and battery cooling expansion valve position increases in the direction of the vertical axis arrow. Alternatively, for two position expansion valves, the vertical axis may represent valve duty cycle (e.g., an on time of the expansion valve divided by a period of a signal driving the expansion valve to open and close) versus time. The horizontal axis represents time and time increases from the left side of the figure to the right side of the figure. Line 314 represents the battery cooling expansion valve position versus time The sixth plot from the top of FIG. 3 is a plot of a position of a passenger compartment cooling expansion valve (e.g., 74 of FIG. 2) versus time. The vertical axis represents passenger compartment cooling expansion valve position and passenger compartment cooling expansion valve position increases in the direction of the vertical axis arrow. Alternatively, for two position expansion valves, the vertical axis may represent valve duty cycle (e.g., an on time of the expansion valve divided by a period of a signal driving the expansion valve to open and close) versus time. The horizontal axis represents time and time increases from the left side of the figure to the right side of the figure. Line 316 represents the passenger compartment cooling expansion valve position versus time The seventh plot from the top of FIG. 3 is a plot of a position of a compressor or pump flow rate (e.g., compressor 60 of FIG. 2) versus time. The vertical axis represents compressor pump flow rate and pump flow rate increases in the direction of the vertical axis arrow. The horizontal axis represents time and time increases from the left side of the figure to the right side of the figure. Line 318 represents the compressor flow rate versus time.

At time t0, the cooling system is looking ahead three travel route segments from the present travel route segment that the vehicle is operating in to estimate the load that the propulsive effort device will, or is expected to, apply to the electric energy storage device (e.g., battery). Looking ahead may comprise retrieving travel route data (e.g., road grade, road surface conditions, road speed limit, etc.) from one or more travel route segments that are ahead of the present travel route segment that a vehicle is traveling on. The travel route data may then be applied to estimate the road load and estimated load that propulsive effort will, or is expected to, place on the electric energy storage device to propel the vehicle. The propulsive effort may be estimated via a vehicle powertrain model. The actual total number of travel route segments that are applied to look ahead in time may be determined according to vehicle operating conditions. It may be desirable to look ahead and use a greater number of travel route segments to estimate propulsive effort during conditions when vehicle mass increases (e.g., cargo and passenger are added to the vehicle) so that additional time may be provided to reach a requested set point electric energy storage device temperature because of the additional vehicle mass. However, if vehicle mass decreases less time may be needed to reach a requested set point electric energy storage device temperature because of the lowered vehicle mass. For example, an increase in vehicle mass may require a lower set point temperature so that the electric machine that provides propulsive effort may continue to operate at rated capacity for a longer period of time. It may take the cooling system more time to reach the lower set point temperature. Thus, if the cooling system looks farther into the future by using additional travel route segments to estimate the load that the propulsive effort device will, or is expected to, apply to the electric energy storage device, more time may be allowed for the electric energy storage device to reach the temperature set point. Conversely, a decrease in vehicle mass may allow a higher set point temperature so that the electric machine that provides propulsive effort may continue to operate at rated capacity. It may take the cooling system less time to reach the higher set point temperature. Thus, if the cooling system looks less into the future by using fewer travel route segments to estimate the load that propulsive error will or is expected to apply to the electric energy storage device, the cooling system may reach the set point temperature sooner and in time to meet cooling demands so that less energy may be used by the cooling system. Further, the cooling system may consume less power when it is operated at a higher set point temperature.

The load that propulsive effort device applies to the electric energy storage device or battery includes three vertical bars that are stacked to show a total load that the propulsive effort device will, or is expected to, apply to the battery. The total load that the propulsive effort device applies to the electric energy storage device is a lower level. The load that the climate control system applies to the electric energy storage device is small. The battery set point temperature is at a higher level and the battery cooling expansion valve position is opened a lower medium amount.

The compartment cooling expansion valve position is at a lower medium level and the compressor flow rate is at a medium level.

At time t1, the cooling system remains looking ahead three travel route segments to estimate the load that propulsive effort will, or is expected to, apply to the electric energy storage device. The load that propulsive effort device is expected to apply to the electric energy storage device or battery includes three vertical bars that are stacked so that the stacked height indicates a total load that the propulsive effort will apply to the battery. The total load that the propulsive effort device applies to the electric energy storage device increases to a middle level; therefore, the battery set point temperature is lowered so that the electric energy storage device may remain below a threshold temperature even when a higher load is applied to the electric energy storage device in the future. The load that the climate control system applies to the electric energy storage device remains small. The electric energy storage device cooling expansion valve position is opened further to a medium amount. The compartment cooling expansion valve position remains at a lower medium level and the compressor flow rate is increased to a higher medium level so that the electric energy storage device set point may be achieved before the load on the electric energy storage device is increased. The lower electric energy storage device temperature set point may allow the electric energy storage device to provide its rated capacity for a longer period of time when load that the propulsive effort device (e.g., the electric machine) increases to match road conditions and driver demand in the future.

At time t2, the cooling system remains looking ahead three travel route segments to estimate the load that propulsive effort device will, or is expected to, apply to the electric energy storage device. The total load that the propulsive effort device applies to the electric energy storage device increases to a higher middle level; therefore, the battery set point temperature is lowered again so that the electric energy storage device may remain below a threshold temperature even when the higher load is applied to the electric energy storage device in the future. The load that the climate control system applies to the electric energy storage device remains small. The electric energy storage device cooling expansion valve position is opened further to a higher medium amount. The compartment cooling expansion valve position remains at a lower medium level and the compressor flow rate is increased to a higher level so that the electric energy storage device set point may be achieved before the load on the electric energy storage device is increased. The lower electric energy storage device set point temperature may allow the electric energy storage device to provide its rated capacity for a longer period of time when load that the propulsive effort device (e.g., the electric machine) increases to match road conditions and forecast driver demand.

Between time t2 and time t3, the load that the propulsive effort will, or is expected to, apply to the electric energy storage device increases and then decreases a small amount, but the electric energy storage device set point temperature is not reduced further since the vehicle has not passed through the travel route segments where propulsive effort is expected to be higher. In addition, the compartment cooling expansion valve is partially closed to make additional refrigerant or coolant available to cool the electric energy storage device. Further, even though the overall load that the propulsive effort device is expected to apply to the electric energy storage device decreases, the electric energy storage device set point temperature is not increased until the vehicle has passed through the individual travel route segments where the load that the propulsive effort machine applies to the electric energy storage device is high.

At time t3, the cooling system remains looking ahead three travel route segments to estimate the load that propulsive effort device will, or is expected to, apply to the electric energy storage device. The total load that the propulsive effort device applies to the electric energy storage device decreases to a lower middle level; therefore, the battery set point temperature is increased so that the electric energy storage device may remain below a threshold temperature while the cooling system consumes less energy. The load that the climate control system applies to the electric energy storage device remains small. The battery cooling expansion valve position is partially closed to a medium amount. The compartment cooling expansion valve position is returned to the lower medium level and the compressor flow rate is decreased to a higher medium level so energy consumed by the cooling system may be reduced.

At time t4, the cooling system remains looking ahead three travel route segments to estimate the load that propulsive effort device will, or is expected to, apply to the electric energy storage device. The total load that the propulsive effort device applies to the electric energy storage device decreases again to a lower middle level; therefore, the battery set point temperature is increased so that the electric energy storage device may remain below a threshold temperature while the cooling system consumes less energy. The load that the climate control system applies to the electric energy storage device remains small. The battery cooling expansion valve position is partially closed to a lower medium amount. The compartment cooling expansion valve position remains at a lower medium level and the compressor flow rate is decreased to a medium level so energy consumed by the cooling system may be reduced.

Between time t4 and time t5, the actual total number of travel route look ahead segments is reduced to two. The actual total number of travel route look ahead segments may be reduced in response to vehicle operating conditions. For example, the actual total number of travel route look ahead segments may be reduced in response to a reduction in vehicle mass, ambient temperature, and internal resistance of an electric energy storage device.

At time t5, the cooling system remains looking ahead two travel route segments to estimate the load that propulsive effort device will, or is expected to, apply to the electric energy storage device. The total load that the propulsive effort device applies to the electric energy storage device is at a lower level; therefore, the battery set point temperature remains unchanged. The load that the climate control system applies to the electric energy storage device increases so the passenger compartment cooling expansion valve is opened further to meet the climate control demand. The battery cooling expansion valve position remains unchanged and the compressor flow rate is increased a small amount so that passenger compartment cooling requirements may be met.

In this way, a single cooling system may be adjusted to meet cooling requirements of a driveline propulsion system and a vehicle climate control system. The electric energy storage device set point temperature may be reduced before higher propulsive loads are requested so that a temperature of a propulsion source may remain below a threshold temperature. The electric energy storage device temperature may be achieved via adjusting a position of one or more valves and a speed of a compressor.

Referring now to FIG. 4, a method for operating a cooling system of a vehicle is shown. The method of FIG. 4 may be included in the system of FIGS. 1 and 2 as executable instructions stored in non-transitory memory. Further still, portions of the method of FIG. 4 may be actions taken in the physical world by a controller.

At 402, method 400 determines a vehicle travel route. The vehicle travel route may be determined via a navigation system according to the vehicle's starting location, a user (e.g., human vehicle driver input, human passenger input, or autonomous drive input) input destination, and maps that are stored within the navigation system. The vehicle travel route may be determined by the navigation system according to routes that are shortest in distance traveled and/or shortest time required to drive the route. Method 400 proceeds to 404.

At 404, method 400 determines an actual total number of travel route segments to look ahead from the present travel route segment the vehicle is traveling on. In one example, the actual total number of travel route segments to look ahead from the present travel route segment the vehicle is traveling on may be a function of vehicle mass, ambient temperature, and internal resistance of an electric energy storage device. In particular, the actual total number of travel route segments to look ahead of a vehicle may increase as vehicle mass increases and it may decrease as vehicle mass decreases. Increasing vehicle mass may increase the propulsive effort used to maintain a vehicle at posted road speeds. Increased propulsive effort may increase a temperature of an electric energy storage device and a load that is applied to the electric energy storage device by a propulsion source. Therefore, it may be desirable to begin reducing a temperature of the electric energy storage device a greater distance before the vehicle reaches a travel route segment where load on the electric energy storage device may be expected to increase so that the set point temperature may be achieved. In addition, lowering the set point temperature may allow an electric energy storage device to operate at higher loads for a longer period of time. In one example, the actual total number of look ahead travel route segments may be output from a function in memory that outputs an actual total number of look ahead travel route segments as a function of vehicle mass.

The actual total number of look ahead travel route look ahead segments may also be adjusted as a function of ambient temperature. In particular, the actual total number of travel route segments to look ahead of a vehicle may increase as ambient temperature increases. As ambient temperature increases, an amount of time for a cooling system to reach a set point temperature may increase due to reduced heat transfer. Therefore, it may be desirable to begin reducing a temperature of the electric energy storage device a greater distance before the vehicle reaches a travel route segment where load on the electric energy storage device may be expected to increase so that the set point temperature may be achieved. In one example, the actual total number of look ahead travel route segments may be modified via a function in memory that outputs an adjustment value to the number of look ahead travel route segments as a function of ambient temperature.

The actual total number of look ahead travel route look ahead segments may also be adjusted as a function of electric energy storage device internal resistance. In particular, the actual total number of travel route segments to look ahead of a vehicle may increase as electric energy storage device internal resistance increases. As electric energy storage device internal resistance increases, an electric energy storage device temperature may increase sooner. Therefore, it may be desirable to begin reducing a temperature of the electric energy storage device a greater distance before the vehicle reaches a travel route segment where load on the electric energy storage device may be expected to increase so that the set point temperature may be achieved. In one example, the actual total number of look ahead travel route segments may be empirically determined and stored in a function in memory that outputs the number of look ahead travel route segments as a function of electric energy storage device internal resistance. Method 400 proceeds to 406 after the actual total number of travel route segments is determined.

In other examples, method 400 may adjust a distance of the look ahead travel route segments as a function of vehicle mass, ambient temperature, and electric energy storage device internal resistance. For example, method 400 may always look ahead a fixed number of travel route segments (e.g., four) to determine expected load applied to an electric energy storage device. However, method 400 may increase the length of distance of travel route segments based on vehicle mass, ambient temperature, and internal resistance of the electric energy storage device. Thus, if look ahead travel route segments are 100 meters and vehicle mass is increased due to adding cargo to a vehicle, the look ahead travel route segments may be adjusted to 140 meters so that the electric energy storage device set point temperature may be lowered sooner. This may allow the electric energy storage device to be maintained under a threshold temperature even during higher load conditions. Similarly, the distance of travel route segments may be adjusted responsive to ambient temperature and the internal resistance of an electric energy storage device so that the electric energy storage device may operate at less than a threshold temperature.

At 406, method 400 estimates a load on an electric energy storage device that is based on travel route segments. As previously mentioned, looking ahead in time may comprise retrieving travel route data (e.g., road grade, road surface conditions, road speed limit, etc.) from one or more travel route segments that are ahead of the present travel route segment that a vehicle is traveling on. The travel route data may then be applied to estimate the road load and estimated load that propulsive effort will, or is expected to, be placed on the electric energy storage device to propel the vehicle. The propulsive effort may be estimated via a vehicle powertrain model and the electric energy storage device temperature increase may be estimated from the load of the propulsive effort. In one example, a function may be indexed or referenced and the function outputs empirically determined electric energy storage device temperature based on the initial temperature of the electric energy storage device and the propulsive effort load that may be applied to the electric machine and to the electric energy storage device. Method 400 proceeds to 408.

At 408, method 400 estimates an internal resistance of an electric energy storage device. In one example, where the electric energy storage device is a battery, the internal resistance of the battery may be determined via measuring an open circuit voltage of the electric energy storage device. Further, the electric energy storage device may be applied to a resistive load and an amount of current flowing through the resistive load and a voltage drop across the resistive may be determined via a voltage input to the controller. Kirchoff's voltage law may be applied to determine a voltage drop across the electric energy storage device's internal resistance. The internal resistance of the electric energy storage device may be determined by dividing the voltage drop across the electric energy storage device's internal resistance by the amount of current that flowed through the resistive load that was external to the electric energy storage device. Method 400 proceed so 410.

At 410, method 400 judges if the cooling system includes a phase changing material to assist in controlling temperatures within the cooling system. In one example, a bit or word in memory may contain a value that indicates whether or not the cooling system includes a phase changing material. If so, the answer is yes and method 400 proceeds to 420. Otherwise, the answer is no and method 400 proceeds to 412.

At 412, method 400 adjusts a temperature set point of the cooling system (e.g., a temperature of an outlet side of an electric energy storage device chiller heat exchanger or a temperature in a cooling loop of the electric energy storage device chiller) responsive to the estimated load on the electric energy storage device as determined from the travel route segments. In one example, method 400 may reference a function of empirically determined temperature set points for an electric energy storage device (e.g., a temperature of an outlet side of an electric energy storage device chiller heat exchanger or a temperature in a cooling loop of the electric energy storage device chiller) according to the load that is estimated to be applied to the electric energy storage device via a vehicle propulsion source and an initial temperature of the electric energy storage device. The temperature set point value may decrease as the load applied to the electric energy storage device increases. Further, the temperature set point value may increase as the load applied to the electric energy storage device decreases. The temperature set point may be maintained or decreased from a first temperature set point up to a time when a vehicle reaches a travel route segment in a group of travel route segments that include a greatest expected load as determined from the group of travel route segments. The temperature set point may be increased after the vehicle passes through the travel route segment where the expected load on the electric energy storage device is expected to be greatest in the group of travel segments. Method 400 proceeds to 414.

In some examples, method 400 may also adjust a second temperature set point when the temperature set point of the electric energy storage device is adjusted based on navigational data. For example, if the temperature set point of the electric energy storage device is reduced in response to an expected load on the electric energy device increasing due to propulsive effort, method 400 may reduce a second temperature set point (e.g., a temperature set point of a passenger compartment) so that the cooling system may have an improved chance of reducing a temperature of the electric energy storage device to the lower temperature set point.

In addition, at 412, method 400 may increase a flow rate of coolant or refrigerant via increasing speed or a compressor or pump (e.g., 60 of FIG. 2) responsive to the estimated load on the electric storage device as determined from the travel route segments. In one example, method 400 may reference a function of empirically determined compressor speeds according to the load that is estimated to be applied to the electric energy storage device via a vehicle propulsion source and an initial temperature of the electric energy storage device. The compressor speed values may decrease as the load applied to the electric energy storage device decreases. Further, the compressor speed values may increase as the load applied to the electric energy storage device increases.

At 414, method 400 adjusts a temperature set point determined at 412 according to an estimated internal resistance of an electric energy storage device. In one example, method 400 may reference a function of empirically determined temperature set point adjustment values that are a function of internal resistance of the electric energy storage device. Method 400 adds the temperature set point adjustment to the value determined at 412 and commands the electric energy storage temperature to the set point temperature. Method 400 may adjust the electric energy storage device temperature to the adjusted set point temperature via adjusting speed of a compressor and a position of a valve (e.g., an expansion valve such as 274 of FIG. 2). In one example, the electric energy storage set point temperature may be decreased as internal resistance of the electric energy storage device increases.

In addition, in one additional representation, method 400 may adjust a temperature of a passenger compartment set point. In particular, if driver demand torque or power is greater than a threshold torque and the electric energy storage device is not reaching the set point temperature, method 400 may increase a set point temperature of the passenger compartment so that the electric energy storage device output may be maintained at a higher level. If driver demand torque or power is less than the threshold torque, method 400 may adjust a set point temperature of the passenger compartment so that the passenger compartment requested temperature may be met. Method 400 proceeds to exit.

At 420, method 400 estimates an amount of time that phase change material may provide cooling to an electric energy storage device. In one example, method 400 may index a table of empirically determined time values according to the load that is expected to be applied to the electric energy storage device, the initial temperature of the phase change material, and the set point temperature of the electric energy storage device. The table outputs an amount of time. Method 400 proceeds to 422.

At 422, method 400 judges if the cooling system including the phase change material at its present temperature may maintain a temperature of the electric energy storage device at a present set point temperature for the duration of the travel route segments that are used to look ahead in time (e.g., two or three travel route segments). If so, the answer is yes and method 400 proceeds to 424. Otherwise, the answer is no and method 400 proceeds to 426. Method 400 may judge that the cooling system and phase change material may maintain the electric energy storage temperature at the set point temperature if the amount of time at 420 is greater than the amount of time that the vehicle is expected to take to travel the actual total number of travel route segments used to look ahead in time to determine load on the electric energy storage device.

At 424, method 400 maintains a present temperature set point of the electric energy storage device, which is based on the estimated load that a propulsion source is expected to apply to the electric energy storage device over the actual total number of travel route segments. Method 400 proceeds to 428.

At 426, method 400 adjusts a temperature set point of the electric energy storage device so that a temperature of the electric energy storage device may remain below a threshold temperature when higher loads are applied to the electric energy storage device. In one example, method 400 adjusts the temperature set point of the electric energy storage device in response to the estimated load that a propulsive effort device will, or is expected to, apply to the electric energy storage device over the present number of travel route segments that are used to estimate the load on the electric energy storage device and the estimated amount of time that the phase change material may provide cooling to the electric energy storage device. In one example, the estimated load that a propulsive effort device will, or is expected to, apply to the electric energy storage device over the present number of travel route segments that are used to estimate the load on the electric energy storage device and the estimated amount of time that the phase change material may provide cooling to the electric energy storage device are used to reference a function of empirically determined temperature set point values and the function outputs a temperature set point value and commands the cooling system to adjust the electric energy storage device to the temperature set point value. Method 400 proceeds to 428.

At 428, method 400 the cooling system may adjust the electric energy storage device to the temperature set point value via adjusting a speed of a compressor and adjusting a position or duty cycle of a valve (e.g., valve 274 of FIG. 2). The compressor speed may be increased when the temperature set point is decreased and the compressor speed may be decreased with the temperature set point is increased.

In this way, method 400 may adjust a temperature set point value of an electric energy storage device so that the electric energy storage device temperature remains below a threshold temperature. This may allow the electric energy storage device to supply power to a propulsive effort device at a rated capacity. In addition, method 400 may consider internal resistance of an electric energy storage device to determine a temperature set point so that the electric energy storage device may remain below a threshold temperature so as to reduce a possibility of degrading the electric energy storage device.

The method of FIG. 4 provides for a method for operating a cooling system of a vehicle, comprising: adjusting a temperature of a cooling system in response to an expected load on a device that is based on navigational data; and adjusting a flow rate of a cooling medium in response to the expected load on the device increasing. The method includes where adjusting the temperature includes lowering a temperature set point, and where the temperature set point is a requested temperature for a traction battery. The method includes where the device is a traction battery. The method further comprises adjusting the temperature in response to an internal resistance of the traction battery. The method includes where adjusting the temperature in response to the internal resistance of the traction battery includes decreasing the temperature set point in response to the internal resistance increasing. The method further comprises adjusting a position or duty cycle of a valve in response to an expected load on a device that is based on navigational data. The method further comprises adjusting a second temperature via adjusting a second temperature set point of the cooling system in response to the expected load on the device that is based on navigational data. The method includes where the second temperature set point is a temperature set point for a passenger compartment of the vehicle.

The method of FIG. 4 also provides for a method for operating a cooling system of a vehicle, comprising: adjusting a temperature of a cooling system to a first temperature in response to an expected load that is a greatest expected load in a group of travel route segments; and maintaining or decreasing the temperature at or above the first temperature up to a time when the vehicle reaches a travel route segment in the group of travel route segments that includes the greatest expected load. The method further comprises increasing the temperature during or after the vehicle exits the travel route segment in the group of travel route segments that include the greatest expected load. The method further comprises adjusting a flow rate of a cooling medium in response to the expected load. The method further comprises adjusting the temperature in response to an internal resistance of a device that is being cooled via the cooling system. The method further comprises cooling a phase changing material in response to the expected load.

Referring now to FIG. 5, a plot of an example travel route and its segments is shown. Vehicle travel route includes a starting position 502 and a destination 504. The vehicle may travel from the starting position 502 to the destination via a road 505. The road 505 may be broken into a plurality of travel route segments (e.g., 510a-510d). The travel route segments may include data regarding the road 505. For example, the travel route segments may indicate the road's greatest grade that is within the travel route segment and the speed limit of the travel route segment. The road load and load that a propulsive effort source applies to an electric energy storage device may be determined from the road grade and speed limit. The travel route segments may be a predetermined distance or length (e.g., 100 meters) or the travel route segments distance or length may be determined according to vehicle operating conditions as previously described. The travel route segments may allow a vehicle controller to provide improved propulsive effort load estimates.

As will be appreciated by one of ordinary skill in the art, methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other system hardware.

This concludes the description. The reading of it by those skilled in the art would bring to mind many alterations and modifications without departing from the spirit and the scope of the description. For example, the systems and methods described herein may be applied to full electric vehicles and vehicles that include an engine and an electric motor for propulsion.

The invention claimed is:

1. A method for operating a cooling system of a vehicle, comprising:
   determining a vehicle travel route;
   dividing the vehicle travel route into a plurality of travel route segments;
   determining an actual total number of look-ahead travel route segments of the plurality of travel route segments to look ahead from a present travel route segment along the vehicle travel route;
   for each of the look-ahead travel route segments, estimating an expected load on a device based on travel route data from the respective look-ahead travel route segments;

estimating an internal resistance of the device;

adjusting a temperature of a cooling system in response to the expected load on the device for each of the look-ahead travel route segments and the estimated internal resistance of the device; and adjusting a flow rate of a cooling medium in response to the expected load on the device increasing.

2. The method of claim 1, where the device is a traction battery, where adjusting the temperature includes adjusting a temperature set point by lowering the temperature set point, and where the temperature set point is a requested temperature for the traction battery.

3. The method of claim 2, where adjusting the temperature set point in response to the internal resistance of the traction battery includes decreasing the temperature set point in response to the internal resistance increasing.

4. The method of claim 1, further comprising adjusting the actual total number of look-ahead travel route segments of the plurality of travel route segments as a function of the estimated internal resistance, where the actual total number of look-ahead travel route segments increases in response to an increase in the estimated internal resistance.

5. The method of claim 1, where the actual total number of look-ahead travel route segments is a function of vehicle mass, ambient temperature, and the internal resistance of the device.

6. The method of claim 1, further comprising adjusting a position or duty cycle of a valve in response to the expected load on the device that is based on navigational data.

7. The method of claim 1, where adjusting the temperature includes adjusting a temperature set point, the method further comprising adjusting a second temperature of the cooling system via adjusting a second set point of the cooling system in response to the expected load on the device that is based on navigational data.

8. The method of claim 7, where the second temperature set point is a temperature set point for a passenger compartment of the vehicle.

9. The method of claim 1, where each travel route segment of the plurality of travel route segments is a pre-determined uniform length.

10. A method for operating a cooling system of a vehicle, comprising:

looking ahead a fixed number of travel route segments of a plurality of travel route segments of a travel route from a current travel route segment of the travel route;

adjusting a length of each of the fixed number of travel route segments;

adjusting a temperature of a cooling system in response to an expected load on a device for each of the fixed number of travel route segments of the plurality of travel route segments and an estimated internal resistance of the device, where the expected load on the device, for each travel route segment of the fixed number of travel route segments, is based on travel route data from the respective travel route segment; and adjusting a flow rate of a cooling medium in response to the expected load on the device increasing.

11. The method of claim 10, where the length of each of the fixed number of travel route segments of the plurality of travel route segments is adjusted based on vehicle mass, ambient temperature, and internal resistance of the device.

* * * * *